United States Patent [19]

Ettel

[11] Patent Number: 4,672,316

[45] Date of Patent: Jun. 9, 1987

[54] METHOD FOR CALIBRATING A MUZZLE VELOCITY MEASURING DEVICE

[75] Inventor: Godwin Ettel, Glattbrugg, Switzerland

[73] Assignee: Werkzeugmaschinenfabrik Oerlikon-Bührle AG, Zürich, Switzerland

[21] Appl. No.: 636,387

[22] Filed: Jul. 31, 1984

[30] Foreign Application Priority Data

Aug. 19, 1983 [CH] Switzerland .......................... 4525/83

[51] Int. Cl.$^4$ .......................................... G01R 35/00
[52] U.S. Cl. ..................... 324/202; 324/207; 340/870.31
[58] Field of Search ............... 324/202, 226, 227, 228, 324/233, 239, 240–243, 95, 179, 180, 160; 340/870.31; 89/6.5, 41.16; 336/129, 45; 33/169 R

[56] References Cited

U.S. PATENT DOCUMENTS

| | | |
|---|---|---|
| 1,307,893 | 6/1919 | Gardner .......................... 336/45 X |
| 2,364,237 | 12/1944 | Neff .......................... 324/208 X |
| 2,452,862 | 11/1948 | Neff .......................... 336/129 X |
| 2,534,565 | 12/1950 | Warren .......................... 324/202 X |
| 2,691,761 | 10/1954 | Smith, Jr. .......................... 324/95 X |
| 2,929,019 | 3/1960 | Bryan . | |
| 3,428,929 | 2/1969 | Brown et al. .......................... 336/129 |
| 3,491,840 | 4/1969 | Randle .......................... 324/202 |
| 3,659,201 | 4/1972 | Vogelsang .......................... 324/179 |
| 3,824,463 | 7/1974 | Oehler .......................... 324/179 |
| 3,872,382 | 3/1975 | Bertram . | |
| 4,244,272 | 1/1981 | Terry et al. .......................... 89/41.16 |
| 4,283,989 | 8/1981 | Toulios et al. .......................... 89/6.5 |
| 4,342,961 | 8/1982 | Zimmermann et al. ............ 324/179 |
| 4,432,141 | 2/1984 | Marcyan .......................... 33/169 R |

FOREIGN PATENT DOCUMENTS 1673382 1/1972 Fed. Rep. of Germany .
1178572 1/1970 United Kingdom .

OTHER PUBLICATIONS

"Determination of the Lines of Force in Axisymmetric Magnetic Fields" by G. P. Prudkovskii and A. V. Khotina, in *Instruments and Experimental Techniques*, vol 14, No. 311, May/Jun. 1971, New York, pp. 883–884.

*Primary Examiner*—Reinhard J. Eisenzopf
*Assistant Examiner*—Warren S. Edmonds
*Attorney, Agent, or Firm*—Werner W. Kleeman

[57] ABSTRACT

In order to be able to carry out accurate measurements with a $V_0$-measurement device, it is important that the desired distance between the two measurement coils of the measurement device be accurately maintained. It has been found that it does not suffice to accurately measure the distance between the end faces of the two measurement coils, since the magnetic field foci of individual measurement coils do not always have the same spacing from the end surfaces. The distance between the magnetic field foci of both measuring coils is measured and is employed for determining the muzzle or initial velocity $V_0$.

1 Claim, 2 Drawing Figures

4,672,316

METHOD FOR CALIBRATING A MUZZLE VELOCITY MEASURING DEVICE

BACKGROUND OF THE INVENTION

The present invention broadly relates to initial velocity measuring devices and, more specifically, pertains to a new and improved construction of a $V_0$-measurement device or muzzle velocity measuring device with which the muzzle or initial velocity of a projectile fired from a weapon is determined and which comprises two measurement coils arranged in mutual spaced relationship which transmit a signal upon passage of the projectile.

Generally speaking, the method of the present invention serves for calibrating a device for measuring the initial or muzzle velocity of a projectile fired from a weapon and comprises the steps of employing a $V_0$-measurement device or muzzle velocity measuring device for measuring an initial or muzzle velocity of a projectile and comprising a first measurement coil having a first magnetic field focus and a second measurement coil having a second magnetic field focus and arranged in mutual axially spaced relationship for transmitting signals upon passage of a projectile, the first magnetic field focus or center and the second magnetic field focus or center having a mutual axial separation distance.

In a known method of this type (cf. German Patent Publication No. 1,673,382, published Jan. 5, 1972) the electrical spacing of both coils is determined in advance by bringing a calibration body successively into those positions relative to each coil in which the output potential of a demodulator is equal to the threshold or trigger potential of a trigger and the distance measured between the two positions of the calibration body is employed for computing the initial or muzzle velocity.

This known calibration method has the disadvantage that, after calibration, the measurement coils of the $V_0$-measurement device may no longer be exchanged, or in other words, if the coils are exchanged the $V_0$-measurement device must be re-calibrated.

SUMMARY OF THE INVENTION

Therefore, with the foregoing in mind, it is a primary object of the present invention to provide a new and improved method for calibrating a $V_0$-measurement device or muzzle velocity measuring device which does not exhibit the aforementioned drawbacks and shortcomings of the prior art constructions.

Another and more specific object of the present invention aims at providing a new and improved method for calibrating a $V_0$-measurement device of the previously mentioned type in which the measurement coils can be selectively exchanged individually or can be randomly exchanged in pairs without detracting from the measurement accuracy of the $V_0$-measurement device or muzzle velocity measuring device and desirably without absolutely requiring recalibration of the measuring device.

Yet a further significant object of the present invention aims at providing a new and improved method for calibrating a $V_0$-measurement device of the character described which is relatively simple in concept, extremely economical to carry out, highly reliable in application, not readily subject to malfunction and requires a minimum of attention.

Now in order to implement these and still further objects of the invention, which will become more readily apparent as the description proceeds, the method of the present invention is manifested by the features that it employs a sensor having two adjacently disposed, opposingly wound sensing coils for determining or checking the axial separation distance and it employs the determined axial separation distance for determining the muzzle or initial velocity of the projectile.

That is, the spacing between the magnetic field foci or centers of the two measurement coils is determined by means of a sensor comprising two adjacently arranged, opposingly wound coils and the determined spacing is employed for the determination of the muzzle velocity.

This method has the advantage that the measurement coils of the $V_0$-measurement device or muzzle velocity measuring device are randomly exchangeable in pairs, since inaccuracies arising in the windings of the measurement coils and a consequent shifting of the magnetic field focus associated with each such coil with respect to the measurement coil can be taken into consideration during calibration by, for instance, employing two measurement coils for a $V_0$-measurement device or muzzle velocity measuring device which exhibit the same deviation so that any error can be compensated.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
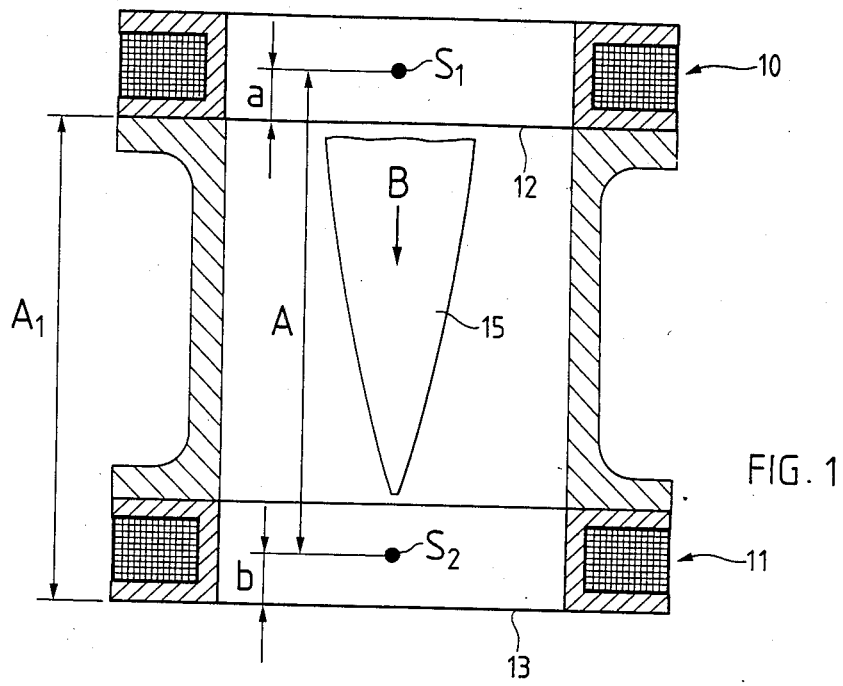
FIG. 1 schematically shows a representation of a $V_0$-measurement device.

Describing now the drawings, it is to be understood that to simplify the showing thereof, only enough of the structure of the initial velocity measuring device has been illustrated therein as is needed to enable one skilled in the art to readily understand the underlying principles and concepts of this invention. Turning now specifically to FIG. 1 of the drawings, the structure illustrated therein by way of example and not limitation and employed to realize the method as hereinbefore described, will be seen to comprise two measurement coils 10 and 11, through which a projectile travels in the direction of the arrow B. The velocity of the projectile is measured in conventionally known manner in the following way:

Upon passage of the projectile 15 through the first measurement coil 10, a first signal is induced and upon passage of the projectile 15 through the second measurement coil 11 a second signal is induced. The initial or muzzle velocity $V_0 = A/t$ of the projectile in meters per second is derived from the distance A between the two measurement coils 10 and 11 and from the time t which elapses between the two signals.

The two measurement coils 10 and 11 each have an end surface designated with the reference numeral 12 and 13, respectively. Should only the spacing or distance $A_1$ between these two end surfaces 12 and 13 be measured and employed for computing the initial or muzzle velocity $V_0$, then it is possible that the computed velocity may be erroneous for the following reasons: if an electrical potential or voltage is applied to the two measurement coils 10 and 11, a magnetic field is generated about each measurement coil 10 and 11. These magnetic fields each have a magnetic field focus or central point which is designated with the reference character $S_1$ for one measurement coil 10 and $S_2$ for the other measurement coil 11 in FIG. 1.

Figure 2:
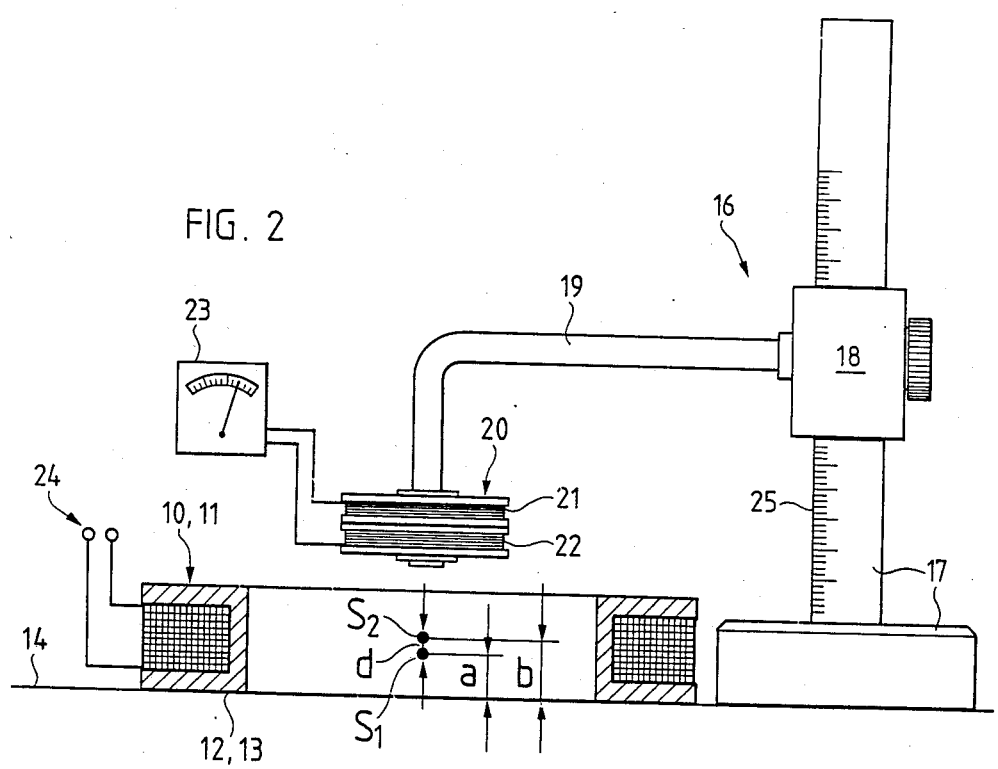
FIG. 2 schematically shows a device for determining the position of the magnetic field focus or center in a measurement coil.

For a precise measurement of the muzzle velocity of a projectile 15, only the spacing or distance A between the two magnetic field foci $S_1$ and $S_2$ of the two measurement coils 10 and 11 is significant. According to FIG. 1 the magnetic field focus $S_1$ of the first measurement coil 10 is situated at distance or spacing a from the end surface 12 of the first measurement coil 10 and the magnetic field focus $S_2$ of the second measurement coil 11 is situated at a spacing or distance b from the end surface 13 of the second measurement coil 11. If the two measurement coils 10 and 11 are identical, then the distances or spacings a and b between the magnetic field foci $S_1$ and $S_2$ and the end surfaces 12 and 13 should be equal. Therefore, as can be seen in FIG. 1, $A_1$ should be equal to A. However, it has been found that this is not so and that it is therefore necessary to determine the distance or spacing A between the two magnetic field foci $S_1$ and $S_2$. According to the invention, it is proposed to determine the distance or spacing A between the magnetic field foci $S_1$ and $S_2$ as follows:

First, a measurement coil 10 is placed upon a surface or support plate 14 according to FIG. 2. A height gauge 16 consisting of a stand 17 and a slide 18 is set up on this surface plate 14. A sensor 20 is fastened to the slide 18 by an arm 19. This sensor 20 comprises two coils 21 and 22 wound in directions opposite one another and is connected to a voltmeter 23. The measurement coil 10 is connected to a power supply 24. A scale 25 upon which the position of the slide 18 can be read is arranged on the stand 17.

The magnetic field generated in the measurement coil 10 with the help of the power supply 24 induces a voltage or potential in the coils 21 and 22 of the sensor 20. This voltage, which can be read on the voltmeter 23, varies when the slide 18 carrying the sensor 20 is shifted along the stand 17. As soon as the sensor 20 is situated in the magnetic field focus point $S_1$, the voltmeter 23 will show a minimum, whereupon the position of the magnetic field focus $S_1$ of the measurement coil 10 can be read on the scale 25 of the stand 17. It will be observed that the value read on the scale 25 does not coincide with the value a represented in FIG. 2, i.e. does not coincide with the distance or spacing between the surface plate 14 and the magnetic field focus $S_1$. This distance or spacing a of the magnetic field focus $S_1$ from the end surface 12 of the measurement coil 10 cannot be determined with the height gauge 16 described here.

In the same manner, the position of the magnetic field focus $S_2$ of the other measurement coil 11 can be determined. A second value for the second measurement coil 11 is read on the scale 25. The difference between these two values corresponds to the value designated as d in FIG. 2 which represents the difference between the distances or spacings a and b of the magnetic field foci $S_1$ and $S_2$ from the surface plate 14, i.e. from the end surfaces 12 and 13 of the measurement coils 10 and 11. The value d corresponds to the distance or spacing of the magnetic field foci $S_1$ and $S_2$ from one another when the measurement coils 10 and 11 are measured or sensed in sequence.

It will be apparent from FIG. 1 that:

$$A_1 = A + b - a.$$

It will be apparent from FIG. 2 that:

$$b - a = d.$$

Therefore:

$$A_1 = A + d.$$

In practice, pairs of measurement coils in which the value d is negligible or as small as possible will be chosen from a large number of measurement coils, so that the spacing or distance A between the magnetic field foci $S_1$ and $S_2$ coincides as nearly as possible with the distance or spacing $A_1$ between the end surfaces 12 and 13 of the measurement coils 10 and 11, i.e. $A_1$ is approximately equal to A.

It is also possible to measure the distance or spacing A between the two magnetic field foci $S_1$ and $S_2$ of the measurement coils 10 and 11 directly on the assembled $V_0$-measurement device or muzzle velocity measuring device. The sensor 20 is introduced into the muzzle velocity measurement device. As the slide 18 carrying the sensor 20 is shifted on the stand 17, first the magnetic field focus $S_1$ and subsequently the magnetic field focus $S_2$ are indicated by the voltmeter 23 and the spacing or distance A can therefore be read directly upon the scale 25.

It is also possible to compare individual measurement coils 10 and 11 to a reference coil in which the distance or spacing of the magnetic field focus or center point from the end surface is known. Individual measurement coils can then be classified according to their degree of deviation from the reference coil. Individual measurement coils 10 or 11 can be exchanged for others of similar classification or pairs of measurement coils 10 and 11 can be formed in which the individual coils are of similar classification. Conceptually, such reference coil may be constituted by the measurement coil 10 or 11 illustrated in FIGS. 2 and all other measurement coils may be compared therewith and classified in relation thereto.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method of assembling a calibrated muzzle velocity measuring device for determining the muzzle velocity of a projectile fired from a weapon, said muzzle velocity measuring device comprising two measurement coils having magnetic field foci and end faces arranged at a predetemined mutual distance for transmitting signals indicative of the time required by the projectile to pass through said predetermined mutual distance of said end faces in order to compute therefrom the muzzle velocity of said projectile, said method comprising the steps of:

providing a reference measurement coil having a reference end face and a reference magnetic field focus arranged at an axial reference distance from said reference end face;

providing a first one of said two measurement coils having a first end face arranged at a first axial distance from a first magnetic field focus;

providing a second one of said two measurement coils having a second end face arranged at a second axial distance from a second magnetic field focus;

measuring the difference value between said first axial distance and said axial reference distance by employing a sensor having two adjacently disposed and opposingly wound sensing coils;

measuring the difference value between said second axial distance and said axial reference distance by employing a sensor having two adjacently disposed and opposingly wound sensing coils; and selecting as said two measurement coils, measurement coils having at least approximately equal such difference values.

* * * * *